3,095,458
WEAK SULFURIC ACID PROCESS FOR CONVERTING ETHYL ETHER TO ETHANOL
Carlton Alexander Judice and Louis Earl Pirkle, Baton Rouge, La., assignors to Esso Research and Engineering Company, a corporation of Delaware
Filed May 14, 1959, Ser. No. 813,305
4 Claims. (Cl. 260—639)

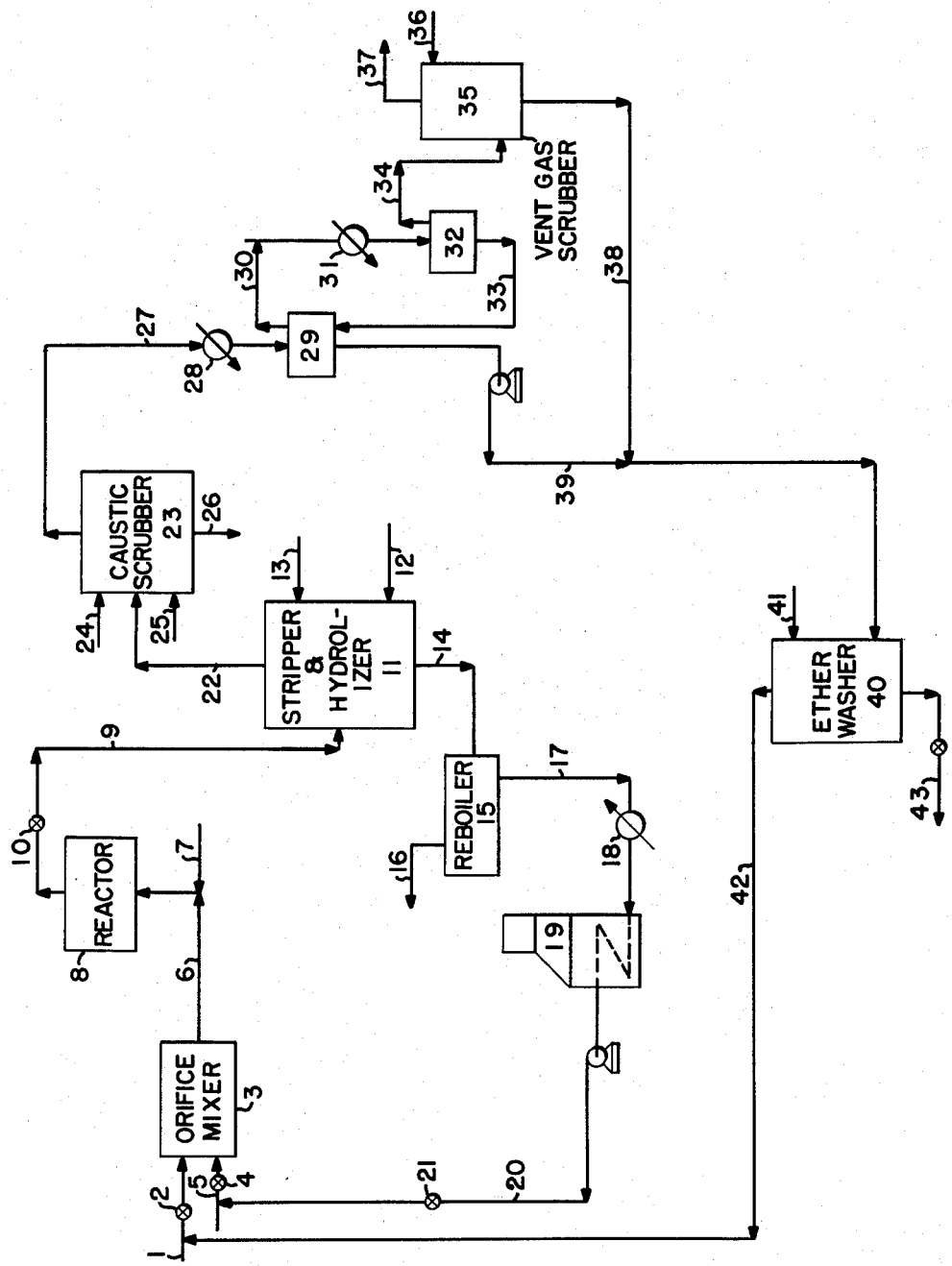

This invention relates to an improved process for converting aliphatic ethers to alcohols by hydration with sulfuric acid wherein the heat of reaction is supplied by the direct admission of steam into the reaction mixture.

In particular, this invention relates to an improved process for converting ethyl ether to ethanol by thoroughly mixing ethyl ether with a sulfuric acid of about 63 to 70 wt. percent concentration at moderate temperatures and injecting steam under elevated pressures directly into the ether-acid mixture and to methods for recovering the resulting ethanol.

More particularly, this invention relates to a process for converting ethyl ether to ethanol wherein an ethyl ether feedstock of 90 to 100% purity is passed under flow control through a mixing zone wherein said ether is contacted and intimately mixed with a 63 to 70 wt. percent sulfuric acid in a ratio of 0.5 to 0.7, preferably 0.6, mole of ether per mole of $H_2SO_4$ at a temperature of less than about 200° F. and preferably in the range of 100° to 200° F. and heated to the temperature of reaction by injecting steam under a pressure of 150 to 200 p.s.i.g. directly into the ether-acid mixture prior to its entry into the reaction zone.

The production of ethyl alcohol by the hydration of ethylene in the presence of an acid catalyst is accompanied by the formation of approximately 10 to 25% of diethyl ether as a by-product. When market demand for ethanol is unusually high or a lag occurs in ether demand, the ether may be converted to alcohol.

One process for such conversion involves passing ether and water under superatmospheric pressures ranging up to 200 atmospheres over a hydration catalyst containing a difficultly reducible hydrous oxide such as alumina, silica, etc. The economics of such processes, however, have not been suitable for commercial use.

It is well known in the art that ethyl ether can be hydrated to ethanol with dilute sulfuric acid. One such process is operated at temperatures in the range of 200° to 300° C. and pressures in the range of 225 to 3000 p.s.i. with a 10 wt. percent sulfuric acid. Such processes have proven unattractive for commercial use due to low yields of ethanol and undesirably high conversions of alcohol to hydrocarbons. In processes of this type various arrangements of heat exchange equipment requiring expensive non-corrosive materials are employed to bring the reaction mixture to the temperature of reaction. If steam is employed at all it is introduced into the reaction zone after or simultaneously with independently heated reactants.

It has now been discovered that high conversions of ether to ethanol can be effected if the ether and acid are thoroughly mixed to form a homogeneous mixture in a controlled ether to acid mole ratio of about 0.5 to 0.7:1 and the temperature of the mixture raised to the temperature of reaction by the introduction of high pressure steam directly into such mixture preferably prior to the entry of such mixture into the reaction zone. The reaction is carried out at a temperature in the range of about 230° to 270° F. To achieve this temperature steam is injected directly into the mixture. The ratio in lbs. of steam/lbs. of acid+ether is in the range of 0.05 to 0.15 with about 0.1 preferred. The steam employed has a temperature in the range of 350° F. to 450° F. and is introduced under a pressure of about 150 to 200 p.s.i.g. The steam can be introduced directly into the reaction zone. However, injection immediately after the ether-acid mixing and prior to entry into the reaction zone is much more satisfactory. In a continuous process a constant ratio of steam to acid and ether is easier to maintain when steam is injected into the feed line to the reactor than where the steam and ether-acid are fed separately into the mixture of reactants, intermediates and products in the reaction zone. The ether-acid mixture can thus be contacted immediately after mixing. These factors tend to reduce over-conversion to hydrocarbons, a problem in all processes known to the art. The instant process provides many other advantages. By effecting the necessary heat exchange through direct contact with steam, the conventional heat exchange equipment may be eliminated. Another saving not insignificant in a large scale continuous process is afforded by the direct heating with steam in that the heat of dilution of sulfuric acid is utilized accounting for about 10° to 15° F. of the required temperature rise.

The conversion to ethanol is controlled by residence time, ether-acid mole ratio, temperature of operation and acid concentration after steam dilution. The pressure in the reaction vessel is not independently important but rather is governed by the temperature of the reacting mixture since a sufficient pressure must be employed to maintain the reacting mixture substantially in a liquid state. The residence time may vary from about 1 to about 4 hours. Residence time in the range of 3 to 4 hours is required at the minimum reaction conditions with a 0.6/1 ether to acid mole ratio, i.e. at a temperature of 230° F. and an acid strength after steam dilution of 60 wt. percent $H_2SO_4$, to yield about 30% conversion based on ether fed to the reactor. When a temperature of 270° F. is employed with a 65 wt. percent acid, after steam dilution, at the same ether-acid raito a residence time of about 1 hour will yield a 60% conversion. All intermediate conditions are operable and provide an efficient process. Lower ether to acid ratios require excessive residence times and excessive acid requirements. Higher ether to acid ratios result in a two-phase operation with resultant low conversion. At temperatures higher than 270° F. appreciable conversion to hydrocarbons occurs. At temperatures lower than 230° F. and/or acid strengths, after steam dilution, below 60 wt. percent low conversions result. The amount of steam introduced should be controlled so as not to reduce the acid strength below about 60 wt. percent. For example, when starting with a reacting mixture at 150° F. which contains 0.6 mole of ether per mole of acid, with the acid present in the form of 68 wt. percent $H_2SO_4$, sufficient heat can be supplied by 200 p.s.i.g. of saturated steam, throttled to about 150 p.s.i.g., to bring the reacting mixture up to about 250° F. without reducing acid strength below 63 to 65 wt. percent $H_2SO_4$.

The reaction vessel must be adapted to withstand elevated pressures of the order of 150 to 250 p.s.i. and temperatures up to 300° F. or higher. The apparatus must be acid resistant and may be made of suitable metal alloys such as chrome steels and the like, or lined with such alloys, or with enamel, carbon, karbate, stone ware, acid resistant brick, and the like.

The reaction mixture upon leaving the reactor contains reacted ether present as ethanol and ethyl sulfate. The product stream is steam stripped, further hydrolyzed, and neutralized with a caustic wash. This is followed by a recovery of both ether and ethanol by a novel wash process. Acid is recovered from the stripping operation and both ether and acid are recycled.

The invention may be more easily understood by referring to the accompany drawing representing a preferred embodiment of the invention.

An ethyl ether feedstock of 90 to 100 vol. percent purity is passed via line 1 through a flow control device represented by valve 2 into a mixing zone 3 where it is contacted and intimately mixed with a 63 to 70 wt. percent sulfuric acid introduced into mixing zone 3 via line 5 under flow control here represented by valve 4. The ether and acid are mixed in a ratio of 0.5 to 0.7, preferably about 0.6, mole of ether/mole of $H_2SO_4$ at a temperature in the range of 100° to 200° F. The resulting mixture is passed from mixing zone 3 into line 6. Steam having a temperature in the range of 350° to 450° F. is introduced into line 6 via line 7 under a pressure of 150 to 200 p.s.i.g. in sufficient quantities to elevate the temperature of the ether-acid mixture to a temperature in the range of about 230° to 270° F. and to dilute the acid in such mixture to a minimum concentration of about 60 wt. percent. The steam heated and steam diluted ether-acid mixture is passed from line 6 into reactor 8 maintained at a temperature in the range of 230° to 270° F. under a pressure of 100 to 200 p.s.i.g. The reaction mixture is maintained substantially in the liquid state and its residence time in reactor 8 may vary from 1 to 4 hours. The reaction mixture is removed from reactor 8 via line 9. Depending on temperature, residence time, etc. as hereinbefore discussed, about 20 to 30% of the ether converted in the process leaves the reactor in the form of ethyl sulfate, and 70 to 80% of the ether converted leaves in the form of ethanol. In passing through line 9 the ethyl sulfate containing mixture passes through a back pressure regulator or flow control device herein represented by valve 10 and is introduced into a stripping column 11 where it is completely hydrolyzed. Saturated steam under a minimum pressure of 10 p.s.i.g. is introduced into stripping column 11 via line 12. Water is introduced near the top of column 11 via line 13 in an amount equal to about 2 to 10 wt. percent of the total stream entering via line 9 to promote hydrolysis and to suppress foaming. Diluted sulfuric acid having a concentration in the range of about 40 to 60 wt. percent $H_2SO_4$ is removed as bottoms from column 11 via line 14 and passed to reboiler 15. Water and low boiling impurities are taken overhead from 15 via line 16 from whence they escape to the atmosphere. A reconcentrated sulfuric acid of about 63 to 70 wt. percent $H_2SO_4$ is removed as bottoms from reboiler 15 via line 17 and passed while in line 17 through a heat exchange unit 18 to an acid storage tank 19 from whence it is recycled to line 4 via line 20 and valve 21.

An overhead stream is removed from column 11 via line 22. This stream containing ethanol, unreacted ether, water vapor and trace impurities comprising entrained $H_2SO_4$, $SO_2$ and high boiling organic compounds, e.g. hydrocarbons, aldehydes and ketones, is passed via line 22 to a conventional scrubber tower 23. A 5 to 10 wt. percent caustic solution comprising sodium or potassium hydroxide, preferably sodium hydroxide is introduced near the top of tower 23 via line 24 to neutralize the $H_2SO_4$ and $SO_2$. Saturated steam under a minimum pressure of 10 p.s.i.g. is introduced into tower 23 via line 25. A bottoms stream comprising spent caustic, water, etc. is removed from tower 23 via line 26. The overhead stream from tower 23 is removed via line 27. This stream comprising ethanol, ethyl ether, water and trace amounts of hydrocarbons is passed through a heat exchanger 28 where cooling water is used to effect the primary condensation of the stream which passes into separator unit 29 where a liquid-gas disengagement is brought about by gravity or other conventional separation techniques. The uncondensed vapors in separator 29 are removed via line 30 passed through a heat exchange unit 31 where they are chilled and condensed by refrigeration at about 35° to 60° F. The condensate passes to separator 32 where a liquid gas disengagement is again effected. The condensate from separator 32 is passed via line 33 to separator 29. Any uncondensed vapors in separator 32 are passed via line 34 to a vent gas scrubber 35 and contacted with water introduced via line 36 to remove trace amounts of ether and ethanol which have not been condensed. The overhead vapors from scrubber 35, removed via line 37, are small in volume and contain mainly ether and hydrocarbon impurities, e.g. ethylene formed in the reaction or present as an impurity in the feedstock. The bottoms stream from scrubber 35 contaniing water with small amounts of ethanol and ether is removed via line 38 and passed to line 39 where it mixes with the condensate stream from separator 29. The combined condensate streams in line 39 are passed to an extraction tower 40 called an ether washer. In the ether washer the feed stream 39 is contacted by water introduced via line 41 which extracts essentially all of the ethanol from the alcohol ether mixture. An ether comprising stream from ether washer 40 is removed overhead via line 42 and recycled to line 1. This stream is about 97 to 99 vol. percent ethyl ether if the operation in washer 40 is conducted as hereinafter set forth. The remaining 1 to 3 vol. percent of this overhead stream is made up of ethanol, water and high boilers, e.g. hydrocarbons, aldehydes, and ketones. These high boilers tend to accumulate in the recycle ether stream and periodically this stream should be purged to maintain the percentage of high boilers in the recycle stream below 2 wt. percent. Water, ethanol and ether in equilibrium proportions pass out of the ether washer as the bottoms stream 43 which constitutes the crude ethanol product. This crude product is sent to conventional ethanol distillation equipment for removal of ether and concentration of ethanol to at least 95 wt. percent.

The crude product stream is controlled to contain from 14 to 20 wt. percent ethanol by adjusting the amount of dilution water. With a 17 wt. percent ethanol concentration the crude product stream 43 contains about 8 wt. percent diethyl ether and about 75 wt. percent water. This concentration makes possible a constant 63% over-all conversion based on fresh ether feed to the process.

The terms "ethyl ether" and "diethyl ether" as used herein have the same meaning.

All percentages cited herein unless otherwise designated shall be construed as percentage by weight.

What is claimed is:

1. In a process for converting diethyl ether to ethanol by reacting said ether with sulfuric acid and hydrolyzing the resulting reaction product, the improvement which comprises intimately mixing diethyl ether with a 63 to 70 wt. percent sulfuric acid in an ether to acid mole ratio of 0.5:0.7::1 to form a reactant mixture, and introducing steam under a superatmospheric pressure of 150 to 200 p.s.i.g. at a temperature of 350° to 450° F. directly into said mixture in sufficient quantities to raise the temperature of said mixture to about 230° to 270° F.

2. A process in accordance with claim 1 wherein said steam is introduced to said mixture in a weight ratio of steam to said mixture in the range of 0.05:0.15::1.

3. In a process for converting diethyl ether to ethanol by reacting said ether with sulfuric acid and hydrolyzing the resulting reaction product, the improvement which comprises intimately mixing at a temperature of less than about 200° F. a diethyl ether comprising stream containing 90 to 100 vol. percent diethyl ether with a 63 to 70 wt. percent sulfuric acid in an ether to acid mole ratio of 0.5:0.7::1 to form an ether-acid mixture, introducing steam having a temperature in the range of 350° to 450° F. directly into said mixture under a pressure in the range of about 150 to 200 p.s.i.g. in sufficient quantities to raise the temperature of said mixture to a temperature in the range of 230° to 270° F., maintaining said mixture at a temperature in the range of 230° to 270° F. for a time in the range of about 1 to 4 hours to form an ethyl sulfate comprising reaction mixture, hydrolyzing said ethyl sulfate to form ethanol and separating said ethanol from said reaction mixture.

4. A process for producing ethanol which comprises intimately mixing a diethyl ether comprising feed stream containing 90 to 100 vol. percent diethyl ether with a 63 to 70 wt. percent sulfuric acid at a temperature in the range of 100° to 200° F. in an ether to acid mole ratio of 0.5:0.7::1 to form an ether-acid mixture, introducing steam having a temperature in the range of 350° to 450° F. directly into said mixture under a pressure in the range of about 150 to 200 p.s.i.g. in an amount sufficient to raise the temperature of said mixture to a reaction temperature in the range of 230° to 270° F. and insufficient to dilute said sulfuric acid to an acid concentration below about 60 wt. percent, passing said mixture and said steam to a reaction zone, maintaining said mixture at said reaction temperature for a time of about 1 to 4 hours to form ethanol and ethyl sulfate, removing said ethanol and ethyl sulfate and unreacted amounts of said reaction mixture from said reaction zone as a product stream, contacting said product stream with water in an amount equal to 2 to 10 wt. percent of the total product stream and introducing saturated steam under a minimum pressure of 10 p.s.i.g. to hydrolyze said ethyl sulfate to ethanol, steam stripping the resulting hydrolyzed product to remove ethanol, unreacted ether, water and entrained acid, contacting said ethanol, unreacted ether, water and entrained acid with a 5 to 10 wt. percent solution of sodium hydroxide in amounts sufficient to neutralize said acid, steam stripping said ethanol, unreacted ether and water from said solution, passing said ethanol, unreacted ether and water to an extraction zone, diluting said ethanol comprising stream with water in controlled amounts, removing a major portion of said unreacted ether overhead from said extraction zone, removing as bottoms from said extraction a water and ethanol comprising stream containing about 14 to 20 wt. percent ethanol, and recovering said ethanol by fractional distillation.

References Cited in the file of this patent
UNITED STATES PATENTS

| | | |
|---|---|---|
| 2,045,785 | Lewis | June 30, 1936 |
| 2,474,569 | Bannon | June 28, 1949 |